Nov. 4, 1969 C. E. BARNES Re. 26,710

WALL FORM SYSTEM AND CLAMP

Original Filed Dec. 24, 1963 2 Sheets-Sheet 1

Charles E. Barnes
INVENTOR.

BY Darbo, Robertson & Vandenburgh
Attorneys

WALL FORM SYSTEM AND CLAMP

Original Filed Dec. 24, 1963 2 Sheets-Sheet 2

Charles E. Barnes
INVENTOR
BY Darby, Robertson & Vandenburgh
Attorneys

United States Patent Office

Re. 26,710
Reissued Nov. 4, 1969

26,710
WALL FORM SYSTEM AND CLAMP

Charles E. Barnes, 820 E. Redwood Lane,
Arlington Heights, Ill. 60004

Original No. 3,218,687, dated Nov. 23, 1965, Ser. No. 333,081, Dec. 24, 1963. Application for reissue Aug. 2, 1967, Ser. No. 661,149
Int. Cl. E04g *17/06, 17/00*
U.S. Cl. 249—40 7 Claims

Matter enclosed in heavy brackets [ ] appears in the original patent but forms no part of this reissue specification; matter printed in italics indicates the additions made by reissue.

*ABSTRACT OF THE DISCLOSURE*

*A waler clamp has a horizontal support for the waler with two upturned ends. The end adjacent the form wall is adapted to receive and engage a form tie. This end is spaced from the form wall. The opposite end has a first vertical portion, an outwardly extending offset and a second vertical portion.*

The instant invention is generally concerned with the forming of poured concrete walls, and is more particularly directed to a novel wall form construction incorporating patentably unique wall form or waler clamps.

While waler clamps of many types are both known and extensively used, various problems arise in connection therewith. For example, lumber, particularly of the grade normally used in form construction, will, in many instances, be either oversized or undersized, this in conjunction with the shrinkage or swelling encountered due to climatic conditions, greatly increasing the difficulty of providing the necessary tensioning of the transversely extending tie rods. This variation in dimensions, particularly in relation to walers, is normally compensated for by the use of separate wedges or integral mechanically adjustable portions, thus requiring either a relatively complex and expensive waler clamp, or the maintaining of a supply of additional pieces, for example the wedges.

Accordingly, it is a primary object of the invention to provide a unique waler clamp capable of accommodating a wide range of dimensional variance in the lumber, in a manner so as to maintain the desired tension on the tie rods, without necessitating the use of any movable parts or separate elements.

In conjunction with the above object, it is also an object of the invention to provide a novel waler clamp which can accommodate the head of the tie rod in a manner so as to eliminate any possibility of the rod separating from the clamp during the pouring and vibrating of the concrete, this also constituting a relatively serious problem in the use of conventional form construction.

Furthermore, inasmuch as modern-day construction sometimes calls for the surface of the poured concrete wall remaining exposed, it is another highly significant object of the instant invention to provide a form construction wherein no direct contact is provided between the waler clamp and the form boards, this direct contact, in more conventional constructions, resulting in a depressing of that portion of the board contacted by the clamp, and a subsequent dimpling of the finished concrete surface, this dimpling greatly detracting from the finished structure in those instances when the concrete face is to be exposed, and simultaneously being both difficult and extremely expensive to correct by, for example, grinding.

In addition, it is a significant object of the instant invention to provide a waler clamp which can, in itself, be quickly mounted and removed, and at the same time easily receive and be separated from the waler.

Also, it is an object of the instant invention to provide a waler clamp which is of extremely rigid construction, adaptable for either light or heavy duty work, while at the same time being of relatively simple construction and capable of repeated use over an almost unlimited time, thus effecting substantial savings to the users.

Further, it is an object of the instant invention to provide a novel overall wall form system through the utilization of a particularly unique waler clamp which eliminates the heretofore significant problems associated with the dimensional variations in various types of lumber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
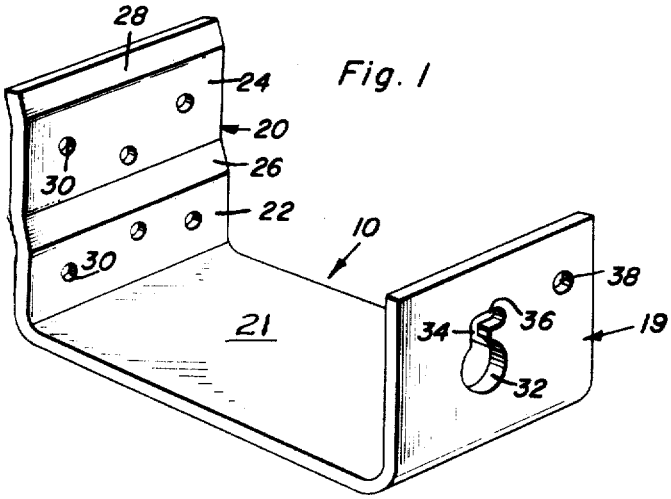
FIGURE 1 is a perspective view of the waler clamp or bracket of the instant invention.
Figure 7:
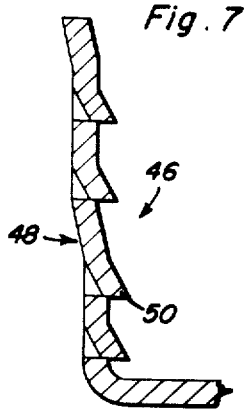
Figure 5:
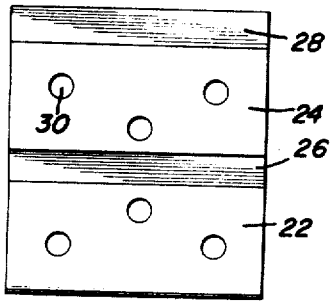
FIGURE 5 is an end view of the outer end of the waler clamp or bracket.
Figure 3:
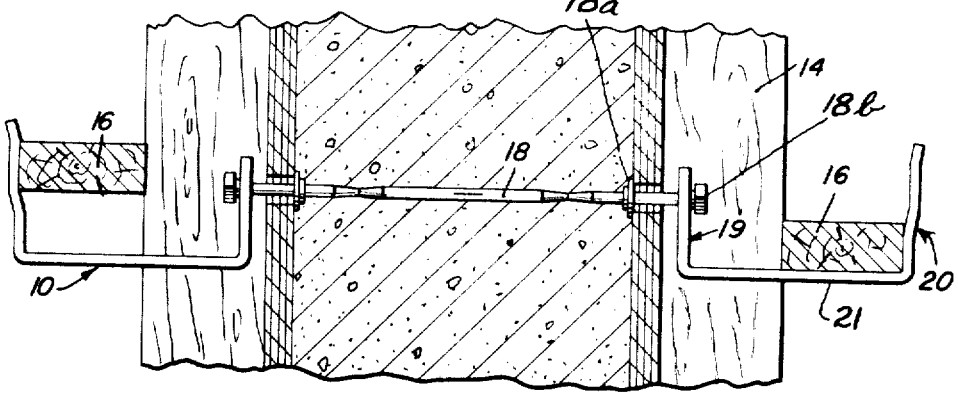
FIGURE 3 is a cross-sectional view taken substantially on a plane passing along line 3—3 of FIGURE 2.
Figure 6:
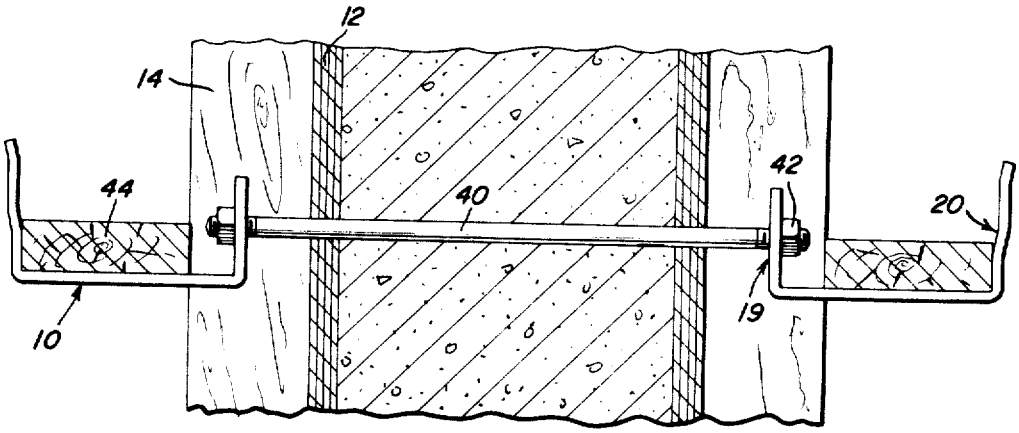
Figure 4:
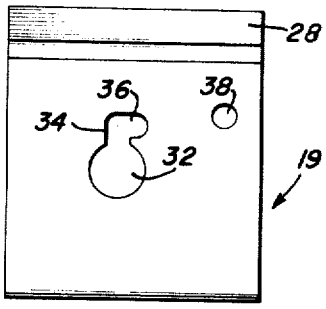
FIGURE 4 is an elevational view of the inner end of the waler clamp or bracket.

FIGURE 6 is a cross-sectional view similar to FIGURE 5 illustrating the adaptability of the waler clamp of the instant invention to the use of a threaded rod rather than a conventional tie rod, this figure also illustrating the use of the waler clamp of FIGURE 3 with a larger waler, for example a 2 x 6 as compared to a 2 x 4; and FIGURE 7 is a partial sectional view through the outer leg of a modified form of waler clamp having gripping teeth thereon.

Referring now more specifically to the drawings, reference numeral 10 is used to generally designate the waler clamp or bracket. This waler clamp 10 is utilized within a wall form system for a poured concrete wall consisting of spaced parallel form panels 12, generally of plywood, vertical studs 14, generally 2 x 4, stiffening the panels 12, horizontally extending walers 16, generally 2 x 4, or 2 x 6, and transversely extending tie rods 18 tying the various elements together, the opposite ends of each tie rod 18 being anchored by one of the waler clamps 10 of the instant invention, these clamps in turn receiving the walers 16 and thereby tensioning the rods 18.

The bracket or clamp 10 is relatively wide for strength and stability, and includes two upturned end portions, the inner end 19 which is orientated in a single vertical plane, and the outer end 20 which is of a greater height than the inner end 19 [and] *connected by a substantially horizontal portion 21. The outer end 20* includes both a vertical lower portion 22 and a vertical upper portion 24 offset slightly outwardly from the lower portion 22 and integral therewith through an inclined intermediate portion 26. The upper edge of the upper portion 24, and thereby the upper edge of the outer leg 20, is also outwardly inclined at an angle so as to form a lip 28. Each of the outer end wall portions 22 and 24 is to be of a height substantially equal to the thickness of lumber conventionally used as walers, such as for example the 2 x 4's indicated as walers in FIGURE 3 and the 2 x 6's indicated as walers in FIGURE 6, each of these portions 22 and 24 forming a flat surface for engagement against the waler. Further, in order to secure the waler 16 within the bracket 10 engaged with either of the portions 22 and 24, depending upon the exact dimension of the lumber 16, a plurality of preformed nail holes 30 are provided through each portion 22 and 24 through which nails are to be driven into the waler 16.

The inner wall 19 of the bracket or clamp 10 includes an enlarged aperture 32 therethrough, this aperture 32 being of a size so as to allow passage of the head of the tie rod. Communicating with this enlarged aperture 32, is a reduced right angular slot consisting of a first vertical portion 34 and a second laterally extending portion 36, the head of the tie rod 18 first being introduced through the aperture 32 and the rod subsequently being moved upwardly and laterally into the slot 36 whereby accidental withdrawal of the bolt head is prevented, thus eliminating a substantial problem, especially during the pouring and vibrating of the concrete. Further, inasmuch as an occasion may arise when additional stability is needed or desired, a single preformed nail hole 38 is provided through the inner wall 19 spaced laterally from the angulated tie rod opening in order that a nail may be introduced therethrough and engaged with the form panel 12.

Figure 2:
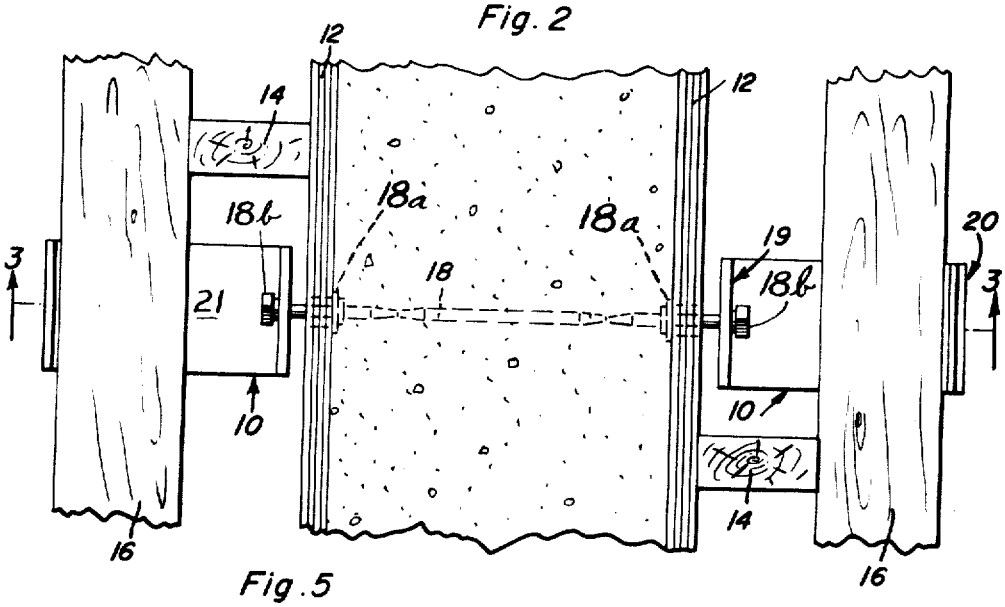
FIGURE 2 is a top plan view of a portion of the wall form system of the instant invention utilizing the waler clamp of FIGURE 1.

As will be appreciated from FIGURES 2, 3 and 6, the clamp 10 is to be of a length sufficient so as to assure that the inner wall 19 be orientated in spaced relation to the outer face of the form panel 12 when using those conventional size structural members normally utilized in this type of construction. For example, the studs 14 are normally 2 x 4's while the walers are usually either 2 x 4's as illustrated in FIGURE 3, or 2 x 6's as illustrated in FIGURE 6 thus requiring that the most common form of the clamp of this invention be approximately 7 inches in length. This positioning of the inner wall 19 in spaced relation to the panel 12 requires the use of longer tie rods, or long headed tie rods as compared to those systems wherein the bracket is to be positioned flush against the panel. However, this use of longer tie rods, in itself, produces significant advantages in that sufficient room is insured to enable one to reach in behind the panel 12 in order to affix the tie rods 18 into the hole drilled in the panel 12 in order to speed up forming the lock-up panel. In addition, the conventional short ties would not protrude through the panels if a door, window or ventilator buck or block-out was in position thus affording no opportunity to affix a clamp, the longer ties 18 of the instant invention, being of a length so as to protrude beyond any such block-out, avoids this problem. Likewise, the use of longer ties, that is ties elongated from the washer *18a* to the head *18b* of the rod, provides that a substantial portion of the tie will protrude from the concrete wall after the stripping of the panels therefrom, this enabling, when it is desired to erect an extension thereon, a starting series of ties over which to place the panels for an upper portion of wall to subsequently be poured. Also, the problem of breaking back the ties after the wall has been formed would be greatly facilitated in view of the relatively long portion of tie protruding which can be easily gripped as compared to the substantial difficulty normally encountered due to the relatively short portion of projecting rod in the more conventional systems. Incidentally, by utilizing such elongated ties, this elongation appearing between the washer and the rod head, various thicknesses of plywood, such as three-quarter inch or five-eighths inch, can be used interchangeably without requiring any adjustment of either the rods or the clamps thus greatly reducing stocking problems.

During the erection of the forms, each clamp 10, after being mounted upon its tie rod 18 would be canted slightly downwardly so as to tend to open the mouth of the clamp for more readily receiving the waler 16 without requiring any pounding or driving of the waler. After the waler 16 is so positioned, the clamp is easily brought up into its final position due to the sliding action of the waler along the inclined portions 26 and 28 and the flat inner faces of the portions 22 and 24.

If the waler 16 is slightly oversized, it would rest against the upper section 24, as illustrated in the left-hand waler of FIGURE 3, and if the waler 16 were undersize it would rest intermediate the sections 22 and 24 or at the bottom of the bracket 10 solely against the section 22, as illustrated by the right-hand clamp in FIGURE 3. Further, another highly significant feature of the spacing of the clamp 10 from the adjoining panel 12 is the fact that further adjustment to compensate for size variations in the lumber can be achieved by canting the clamp slightly upward so as to tighten itself against the waler when undersize lumber is encountered or conversely, by canting the clamp slightly downward so as to provide more room for very oversize lumber. Likewise, the removal of the clamp is achieved simply and effectively by merely requiring slight downward taps on the projecting or stripping lip 28, this being done without any damage whatsoever to the panel 12 such as frequently occurs in conventional set-ups when the clamps are engaged directly with the panel, the release of the clamps in such situations normally requiring that they be driven loose from a locked in position with the panel.

While the bracket 10 of the instant invention has been particularly described for use with single 2 x 4's or 2 x 6's, it will also be appreciated that 4 x 4's or double 2 x 4's or 2 x 6's can also be used for additional security, the provision of two separate positions within the clamp 10 along with the ability of the clamps to be tightened or loosened by a slight canting thereof, enabling this accommodation of larger members.

Incidentally, another advantage residing in the particular structure of the clamp 10 is the fact that, due to the greater height of the outer wall 20, a back guard is in effect provided against any possibility of injury arising from the infrequent though not unknown possibility of the tie rod head, upon being tensioned, popping off with substantial force.

Referring now specifically to FIGURE 6, this figure is intended to illustrate that the bracket or clamp 10 of the instant invention is equally adapted for use with tie rods in the form of conventional threaded bolts 40 insertable through the apertures 32 in opposed clamps 10 and locked thereto by nuts 42, this figure also illustrating the utilization of 2 x 6 walers 44 as compared to the 2 x 4 walers 16 of FIGURE 3.

*When wet concrete is poured into the forms and the concrete is vibrated, considerable outward pressure is applied to panels 12 tending to push them apart. It is a purpose of this system, as is the case with other conventional forming systems, to use the tie rod 18, 40 to hold the panels together and to transmit this outward force on each panel from the panel to the tie rod. Because of the spaced relationship of the panel 12 and the inner end 19 of the bracket 10 in the present system, this transfer of force from the panel to the tie rod occurs only from the panel to the studs 14, then to the outer end 20 of the bracket 10 through the waler 16, and finally through the portion 21 of the bracket from the outer end 20 to the inner end 19 connected to the tie.*

FIGURE 7 illustrates a slightly modified form of clamp 46 wherein the stepped upturned outer leg 48 is provided with a plurality of inwardly extending gripping teeth 50 formed in a manner so as to fixedly retain an inserted waler. These teeth, while having been illustrated as formed by inwardly offsetting portions of the leg 48, can be formed in any other suitable manner such as for example by the welding of a separate toothed grid to the inner face of the leg 48. The leg 48, similar to the leg 20, also includes two parallel offset vertical portions interconnected by an inclined portion and terminating at its upper edge in an outwardly inclined lip for both facilitating the introduction of a waler and facilitating a release of the clamp.

From the foregoing, it will be appreciated that a simple though highly novel waler clamp has been described, this clamp consisting basically of a relatively wide flat elongated member having upturned ends, one of said ends including parallel offset portions interconnected by an inclined portion, with the upper portion terminating in an outwardly and upwardly inclined lip, both of these portions being of a height substantially equal to the thickness of a conventional waler, this in the most frequently used size being on the order of two inches. In addition to the specific waler clamp, a unique system has also been described wherein an effective clamping of a wall form is provided without any possibility of damage to the form panels, the completed wall or the clamps used. Also, as has been pointed out in detail supra, both the waler clamp itself and the general form system incorporate highly original means for compensating for variations in lumber sizes due to the different types of lumber used, climatic changes, and wear from repeated use of the lumber, this being accomplished without requiring either the use of additional members, such as wedges, or any mechanically adjustable parts such as locking bolts etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A waler clamp comprising a relatively wide elongated flat member, said member having the opposite end portions thereof upturned *with the distance between said upturned end portions being no less than the width of an ordinary waler and the height of each of said end portions being less than the amount of said distance,* a first one of said upturned end portions including a first vertical section terminating in an outwardly and upwardly inclined section which in turn terminates in a second vertical section parallel to the first vertical section for accommodating variations in waler sizes, and means for engaging the second upturned end portion with a tie member.

2. The structure of claim 1 wherein said second vertical section terminates in an upwardly and outwardly inclined lip, said means *includes* [including] an enlarged aperture through the second end portion and a reduced right angular slot [communicated] *communicating* therewith, *and* said slot also [extending] *extends* through this second end portion.

3. A waler clamp [consisting of] *comprising* a flat relatively wide elongated member, the opposite end portions of said member being upturned in generally parallel spaced planes *with the distance between said upturned end portions being no less than the width of an ordinary waler and the height of each of said end portions being less than the amount of said distance,* a first one of said end portions being of a greater height than the other of said end portions, said first one of said end portions including a pair of vertically spaced laterally offset vertical [section] *sections* located in parallel vertical planes and interconnected by an upwardly and outwardly inclined section, each of said vertical sections being of a greater height than said inclined section.

4. A wall form system *having components* including spaced parallel form panels, vertically extending stiffening studs engaged with the outer surfaces of these panels, at least one transversely extending tie rod projecting through the panels and extending therebeyond, a pair of waler brackets, each waler bracket including inner and outer generally parallel walls rigidly interconnected in spaced relation to each other by a substantially flat horizontally extending portion, the inner wall of each bracket being secured to one end of the tie rod, and a waler member compressed between the other leg of each bracket and the adjoining stiffening stud, the inner leg of each bracket being in spaced relation to the adjoining *components, other than the tie rod, of the* form [panel] *system* so as to define a void and enable a canting of the bracket without the exertion of pressure on that portion of the panel in alignment with the bracket, *said system being such that said void is maintained during and after concrete is poured between said panels and vibrated whereby the pressure of the concrete on the panel is transferred to the tie only through the studs, then the walers, then the outer wall of the bracket, the substantially horizontal portion of the bracket and then the inner wall of the bracket.*

5. The structure of claim 4 wherein the outer leg of each bracket includes two vertically spaced laterally offset substantially vertical portions integrally interconnected through an intermediate inclined portion.

6. A poured concrete wall form including spaced parallel form panels, stiffening studs engaged with the outer surfaces of the panels, elongated walers extending transversely to the studs and engaged against the outer faces thereof, waler brackets, said waler brackets including integrally connected spaced generally parallel inner and outer legs, the outer leg of each bracket being compressed against the outer surface of a waler, the inner leg of each bracket being spaced inwardly of the inner surface of the corresponding waler and outwardly of the adjoining panel so as to define a void between the inner leg and the adjoining panel, said brackets being arranged in pairs, one on each side of the parallel panels, and an elongated tie rod having the opposite ends thereof secured under tension to the inner legs of each pair of brackets, said outer leg of each bracket including two vertically spaced laterally offset substantially vertical portions integrally interconnected through an intermediate inclined portion, said outer leg of each bracket further being of a height sufficient so as to accommodate a second waler, of the same thickness as the first waler, therein.

7. A waler clamp consisting of a flat relatively wide elongated member, the opposite end portions of said member being upturned in generally parallel spaced planes *with the distance between said upturned end portions being no less than the width of an ordinary waler and the height of each of said end portions being less than the amount of said distance,* a first one of said end portions being of a greater height than the other of said end portions, said first one of said end portions including a lower vertical section and an upper vertical section laterally offset outwardly from the lower vertical section for accommodating variations in waler sizes, an intermediate section integrally interconnecting said vertical sections, and means for engaging the other of said end portions with a tie member.

References Cited

The following references, cited by the Examiner, are of record in the patented file of this patent or the original patent.

UNITED STATES PATENTS

| | | | |
|---|---|---|---|
| 1,109,934 | 9/1914 | Muldon | 25—131 |
| 2,273,198 | 2/1942 | Hillberg | 25—131 |
| 2,940,153 | 6/1960 | Allen | 25—131 |
| 2,952,060 | 9/1960 | Allen | 25—131 |
| 3,007,221 | 11/1961 | Kenney | 25—131 |
| 3,150,429 | 9/1964 | Shaffer | 249—207 |
| 1,954,928 | 4/1934 | Graef. | |
| 2,298,837 | 10/1942 | Oswald. | |
| 2,882,583 | 4/1959 | Arrighini et al. | 249—219 X |
| 3,236,486 | 2/1966 | Allen | 249—219 X |

FOREIGN PATENTS

| | | |
|---|---|---|
| 983,222 | 2/1951 | France. |
| 9,059 | 4/1912 | Great Britain. |

J. SPENCER OVERHOLSER, Primary Examiner

R. D. BALDWIN, Assistant Examiner

U.S. Cl. X.R.

249—219

PO-1050
(5/69)

UNITED STATES PATENT OFFICE
CERTIFICATE OF CORRECTION

Patent No. Re. 26,710 Dated November 4, 1969

Inventor(s) Charles E. Barnes

It is certified that error appears in the above-identified patent and that said Letters Patent are hereby corrected as shown below:

Column 5, Line 69 - "other" should read --outer--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents